No. 766,832. Patented August 9, 1904.

UNITED STATES PATENT OFFICE.

WILLIAM R. LONG, OF PEORIA, ILLINOIS, ASSIGNOR, BY MESNE ASSIGNMENTS, TO JULIA C. LONG, OF ST. LOUIS, MISSOURI.

PROCESS OF MAKING PRODUCT OF SUGAR AND MALT.

SPECIFICATION forming part of Letters Patent No. 766,832, dated August 9, 1904.

Application filed May 18, 1903. Serial No. 157,548. (No specimens.)

*To all whom it may concern:*

Be it known that I, WILLIAM R. LONG, a citizen of the United States, residing in Peoria, in the county of Peoria and State of Illinois, have invented certain new and useful Improvements in Processes of Making a Product of Sugar and Malt, of which the following is a full, clear, and exact description.

My invention relates to a process of making a product of sugar and malt involving a flavor heretofore unproduced, obtained by the use of ingredients consisting of ordinary sugar and malt combined in proper proportions to produce the flavor desired.

My invention consists in features of novelty hereinafter fully described, and pointed out in the claims.

My process consists of a combination of ordinary sugar such as that produced from cane, beets or grape-sugar, and malt, the latter being first reduced to an extract and then combined with the ordinary sugar to produce the desired product.

The process consists in first taking coarsely-ground malt, preferably that known as "caramel-malt," which is made from barley, and steeping it with water in vats at a temperature of from 150° to 180° Fahrenheit. This steeping operation is continued for about three hours, at the end of which time the extract or infusion of malt is drawn off and an additional quantity of warm water is placed in the vat with the remaining mass of malt. After a short time this last infusion is drawn off and added to the extract first removed from the vat. When the extract has been allowed to settle sufficiently—say from one to two hours—it is drawn from the receptacle in which it is contained by a siphon or other means, and the residue or sediment from the extract is thereby left in the receptacles in which the extract was contained. If desired, after the extract has been drawn off from the last-named receptacle it may be filtered for further clarification. The extract is then boiled in an open kettle or vacuum-pan to a density of fifteen degrees (15°) Baumé scale for syrup. It is then taken from the kettle or vacuum-pan and filtered through a cloth or other suitable filtering medium.

The next step in the process is to place a specific amount of sugar, which I prefer to be of light brown or medium color, in a cooking-kettle, with a small amount of water added thereto. At the same time a quantity of the malt extract previously produced is introduced into the kettle containing the ordinary sugar, the quanity of malt extract being preferably two ounces for each pound of ordinary sugar. The sugar and malt extract mass is then cooked until it reaches a temperature of 270° Fahrenheit, and water is then added to the mixture to reduce its temperature to 250° or 255° Fahrenheit. The syrup at this time present in the kettle is drawn off into a receptacle and briskly stirred, either manually or by machinery, until crystallization has been satisfactorily developed, and it is then poured into molds to cool and is then in a condition ready for use or the market.

A product made as herein described contains a flavor peculiarly its own and one that renders the product very desirable for confectioners' and syrup-manufacturers' purposes, owing to the pleasing flavor obtained by the use of malt in combination with ordinary sugar and in the method of cooking. The product is also very desirable for use by brewers and bakers when made from grape-sugar.

It is obvious that the process of making the product may be altered very slightly to produce a syrup instead of sugar simply by omitting the graining step of the process and adding a small quantity of glucose, if desired, to prevent crystallization.

I therefore do not consider myself limited strictly to the process of making a crystallized product, but maintain that it may be considered to include syrup as well as a crystallized product, though described as a process of making a crystallized product.

While I prefer to carry out the process of making my product under the temperatures hereinbefore described, I do not wish to be strictly confined to cooking the mass from which the product is made to the specific temperatures named, as it may be possible to produce a valuable product without adhering to these specific temperatures, though I prefer cooking the mass in the manner set forth.

I claim as my invention—

1. The process of making a product from sugar and malt which consists in heating sugar and an extract of malt together.

2. The process of making a product from sugar and malt, which consists in heating sugar and an extract of caramel-malt together.

3. The process of making a product from sugar and malt, which consists in heating sugar with an extract of caramel-malt to about 270° Fahrenheit.

4. The process of making a product from sugar and malt, which consists in heating sugar with an extract of caramel-malt to about 270° Fahrenheit, reducing the temperature of the mixture to about 250° Fahrenheit to 255° Fahrenheit and stirring the mixture until crystallization takes place.

WILLIAM R. LONG.

In presence of—
M. SCHULTZ,
GEO. W. PERRY.